United States Patent [19]
Takakura et al.

[11] Patent Number: 5,975,267
[45] Date of Patent: Nov. 2, 1999

[54] UNILATERAL DISC-TYPE FRICTION CLUTCH WITH THERMAL DISTORTION AVOIDANCE FEATURE

[75] Inventors: Norio Takakura; Yuzuru Sanbongi, both of Hokkaido, Japan

[73] Assignee: Dynax Corporation, Hokkaido, Japan

[21] Appl. No.: 08/922,418

[22] Filed: Sep. 3, 1997

[30] Foreign Application Priority Data

Sep. 4, 1996 [JP] Japan ................................. 8-252179

[51] Int. Cl.[6] ..................... F16D 25/0638; F16D 13/64
[52] U.S. Cl. ............................... 192/70.14; 192/85 AA; 192/107 R
[58] Field of Search ...................... 192/85 AA, 107 R, 192/58.42, 70.11, 70.14

[56] References Cited

U.S. PATENT DOCUMENTS

| | | | |
|---|---|---|---|
| 2,850,118 | 9/1958 | Byers | 192/107 R X |
| 4,736,828 | 4/1988 | Diessner | 192/70.14 X |
| 4,932,509 | 6/1990 | Binder | 192/70.14 X |
| 5,080,211 | 1/1992 | Wiese et al. | 192/70.14 X |
| 5,148,900 | 9/1992 | Mohsn | 192/70.14 X |
| 5,398,793 | 3/1995 | Stephens et al. | 192/70.14 X |
| 5,404,978 | 4/1995 | Hagiwara | 192/70.14 X |
| 5,452,784 | 9/1995 | Miyoshi et al. | 192/70.14 X |

Primary Examiner—Richard M. Lorence
Assistant Examiner—Saúl J. Rodríguez
Attorney, Agent, or Firm—Howson and Howson

[57] ABSTRACT

In a clutch for an automatic transmission having a unilateral clutch disc construction in which outwardly toothed plates are interleaved with inwardly toothed plates, and the plates have friction faces only on one side, the inner peripheries of the outwardly toothed plates and the outer peripheries of the inwardly toothed plates have circumferentially spaced notches. These notches prevent distortion due to thermal expansion occurring when the clutch discs are unevenly engaged.

2 Claims, 6 Drawing Sheets

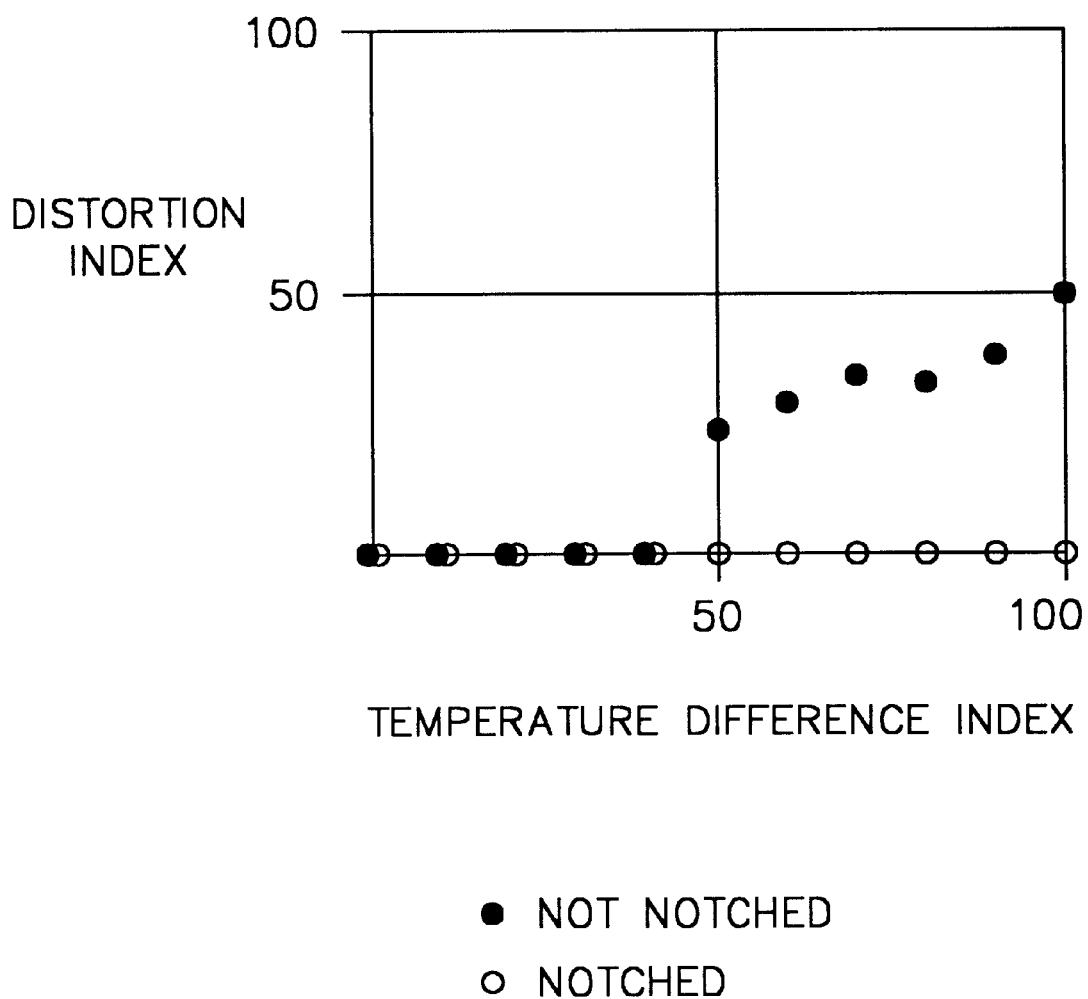

5,975,267

UNILATERAL DISC-TYPE FRICTION CLUTCH WITH THERMAL DISTORTION AVOIDANCE FEATURE

SUMMARY OF THE INVENTION

This invention relates generally to friction clutches, and more particularly to improvements in friction clutches of the kind incorporated into automatic transmissions of motor vehicles.

A typical conventional friction clutch mechanism comprises a set of externally toothed clutch discs splined to a drum and interleaved with a set of internally toothed clutch discs splined to a hub. Each of the internally toothed discs has clutch facings on both of its opposite faces. The clutch facings are brought into frictional contact with the externally toothed discs by a hydraulic piston. Even in the case of a "wet" friction clutch, cooled by a liquid, intense frictional heat is generated in the clutch faces and in the externally toothed discs. Most of the heat is transmitted through the externally toothed discs, which are therefore desirably thick in the axial direction so that they have a large heat capacity for improved heat dissipation. However, the large axial thickness of the externally toothed discs contributes significantly to the overall weight and size of the clutch mechanism.

The overall weight and size of the clutch mechanism can be reduced by the adoption of a unilateral construction, the term "unilateral" referring to the fact that each of the clutch discs is provided with a clutch facing on only one of its two opposite sides. Thus, both the internally toothed discs and the externally toothed discs have clutch facings, and all of the clutch facings face in the same direction along the axis of rotation of the mechanism. The heat generated in the clutch faces is transmitted through the internally toothed discs as well as through the externally toothed discs. Therefore the externally toothed discs need not be as thick as in the case of a conventional clutch mechanism, and the weight and size of the clutch mechanism can be reduced.

However, although the unilateral construction affords advantages in terms of size and weight reduction, it is subject to the problem of distortion due to thermal stress. Frictional heat is generated only at one face of each disc, and the clutch discs are often in uneven contact with one another. The distortion of the clutch discs entails an increase in drag torque, and burning of the clutch discs occurs, seriously interfering with the proper functioning of the clutch mechanism.

The principal object of this invention, therefore, is to provide an improved clutch mechanism which has the advantages of reduced size and weight of a unilateral disc type friction clutch, but which avoids or alleviates the problems resulting from thermal distortion.

Thermal distortion of a clutch disc is attributable to thermal strain between the inner peripheral portion and the outer peripheral portion of the disc. For example, if only the outer peripheral portion of a clutch disc is in frictional contact with a clutch facing, its temperature will increase to a level well above the temperature of the inner peripheral portion of the disc. The resulting radial expansion of the outer portion without a corresponding expansion of the inner portion produces distortion of the disc. In accordance with the invention, the discs are constructed with notches in order to avoid distortion caused by differences in the thermal expansion of the inner and outer portions of the discs.

A unilateral clutch disc type friction clutch mechanism in accordance with the invention comprises a torque transmitting unit having a first set of internally toothed clutch discs and a second set of externally toothed clutch discs interleaved with the discs of the first set. The clutch discs of each set comprise a plurality of plates, each having opposite faces, arranged in spaced relationship to one another along an axis perpendicular to the faces of the plates. At least all but one of the plates of each set has a friction member, and each plate with a friction member has its friction member only on one of its faces. The friction members all face in the same direction along the axis so that each of the friction members is engageable with an opposed disc plate. A piston is provided to effect engagement of the friction members with opposed disc plates. Each of the plates of the internally toothed clutch discs has notches in its outer circumference, and each of the plates of the externally toothed clutch discs has notches in its inner circumference.

As will become apparent from the following detailed description, the notches absorb circumferential and radial strain caused by thermal expansion, especially when the clutch discs are unevenly engaged, and therefore avoid, or at least alleviate, distortion of the clutch discs and the problems that result from distortion, in a unilateral clutch mechanism.

Other objects, details and advantages of the invention will be apparent from the following detailed description when read in conjunction with the drawings.

BRIEF DESCRIPTION OF THE DRAWINGS

FIG. 7 is a plot showing the relationship between temperature difference and distortion for a clutch plate with notches in accordance with the invention and a clutch plate without notches.

DETAILED DESCRIPTION

Figure 8:
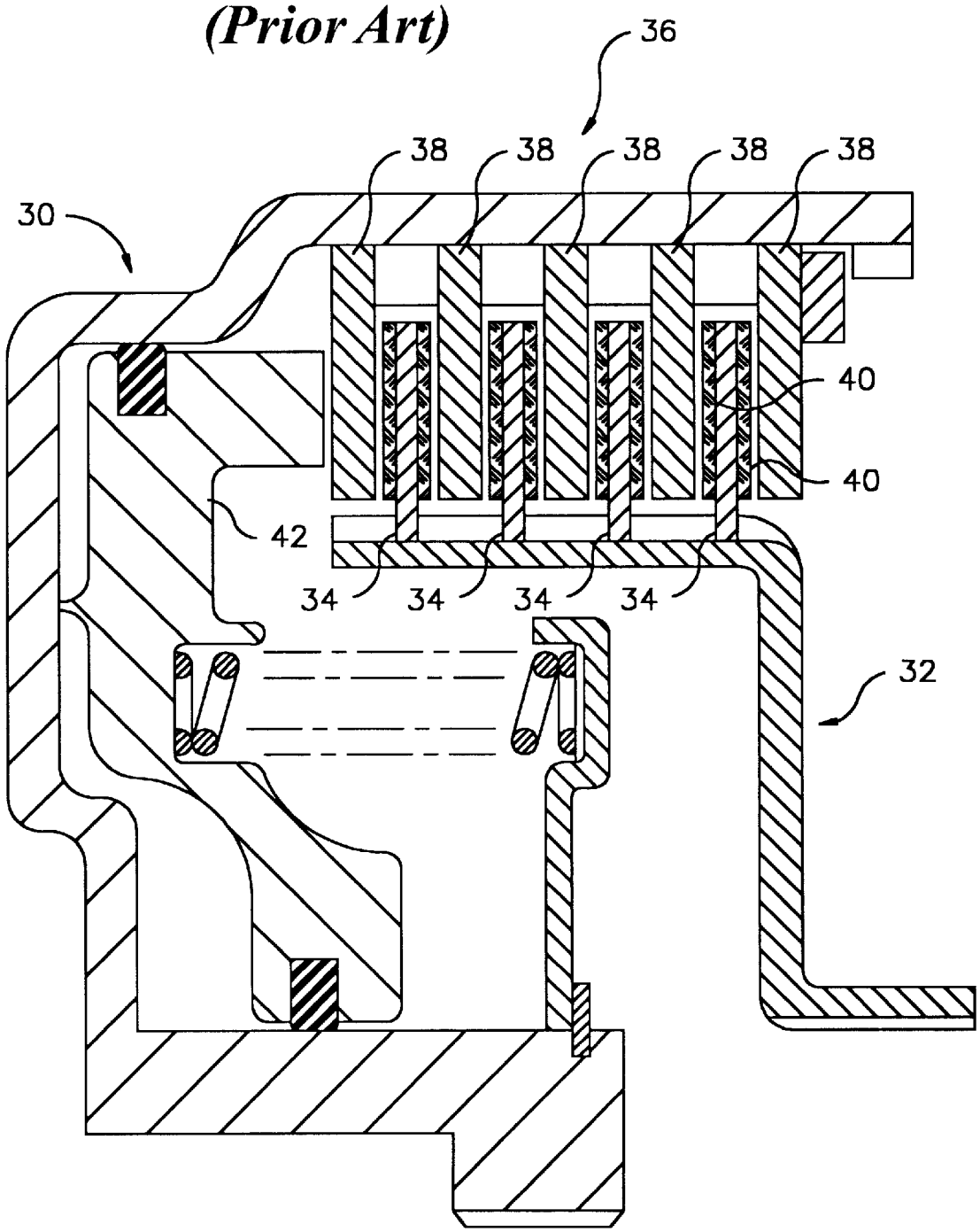
FIG. 8 is a fragmentary longitudinal section of a conventional friction clutch mechanism of the bilateral clutch disc type.

FIG. 8 shows a typical conventional bilateral clutch mechanism 30, having a hub 32, and internally toothed clutch discs 34 splined to the hub. Externally toothed clutch discs 38 are splined to a drum 36, and are interleaved with the clutch discs 34, so that internally toothed and externally toothed clutch discs are arranged in alternating succession, proceeding along the axis of rotation of the clutch mechanism.

Clutch facings 40 are attached to the opposite faces of each of the internally toothed clutch discs 34. A hydraulic piston 42 moves axially to cause the clutch facings 40 on the internally toothed clutch discs 34 to engage the faces of the externally toothed discs 38 frictionally, for torque transmission. In an automatic transmission, the friction clutch mechanism is typically a "wet friction clutch" having its friction surfaces cooled by a cooling liquid.

In the friction clutch mechanism 30, intense frictional heat is generated in the clutch faces 40 and in the externally toothed discs 38. Most of the heat thus generated is transmitted through the externally toothed clutch discs 38. Therefore, these discs are need to be thick in the axial direction, as depicted schematically in FIG. 2.

Figure 1:
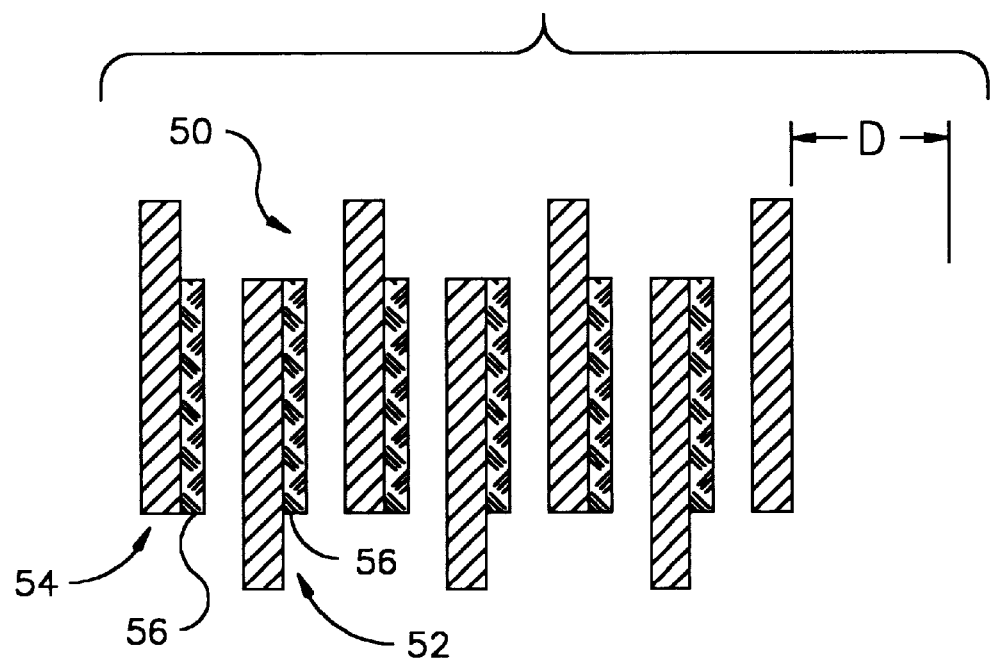
FIG. 1 is a schematic view of a typical friction clutch mechanism of the unilateral clutch disc type.

In FIG. 1, which shows schematically a clutch mechanism 50 of the unilateral clutch disc type, each clutch plate (except for the rightmost outwardly toothed clutch plate) has a clutch facing of frictional material. Each clutch plates having a facing of frictional material has the facing only on one of its surfaces, and all of the frictional facings face in the same direction. Discs 52 are internally toothed, unilateral discs, having clutch facings 56 on one surface only, and discs 54 are externally toothed, unilateral discs, similarly having clutch facings 56 on one surface only. The internally toothed and externally toothed clutch discs are arranged in interleaved relationship so that the internally toothed discs and the externally toothed discs are disposed alternately along the axis of rotation of the mechanism, with the clutch facings 56 of the externally toothed discs engageable with the plates of internally toothed discs, and with the clutch facings 56 of internally toothed discs engageable with the plates of externally toothed discs.

Figure 2:
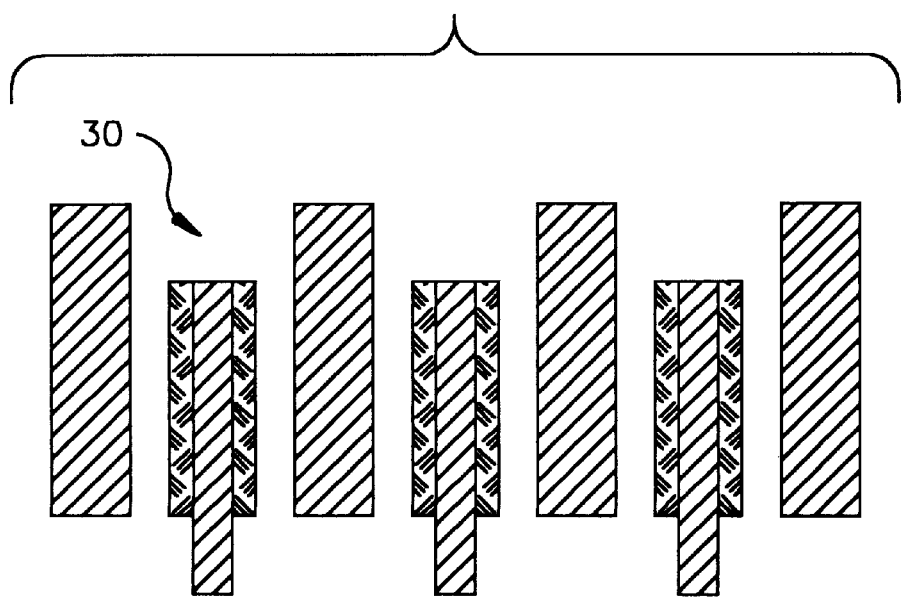
FIG. 2 is a schematic view of a typical friction clutch mechanism of the bilateral clutch disc type.

Heat generated in the clutch faces can be transmitted both through the internally toothed discs 52 and through the externally toothed discs 54, and consequently neither the internally toothed discs nor the externally toothed discs need to be especially thick as in the case of the bilateral disc type clutch mechanism of FIG. 2. Therefore, as is apparent from a comparison of FIGS. 1 and 2, the axial dimension of the friction clutch mechanism 50 is smaller than that of the mechanism 30 by an amount "D", even though both mechanisms have the same heat dissipating capacity.

Figure 3:
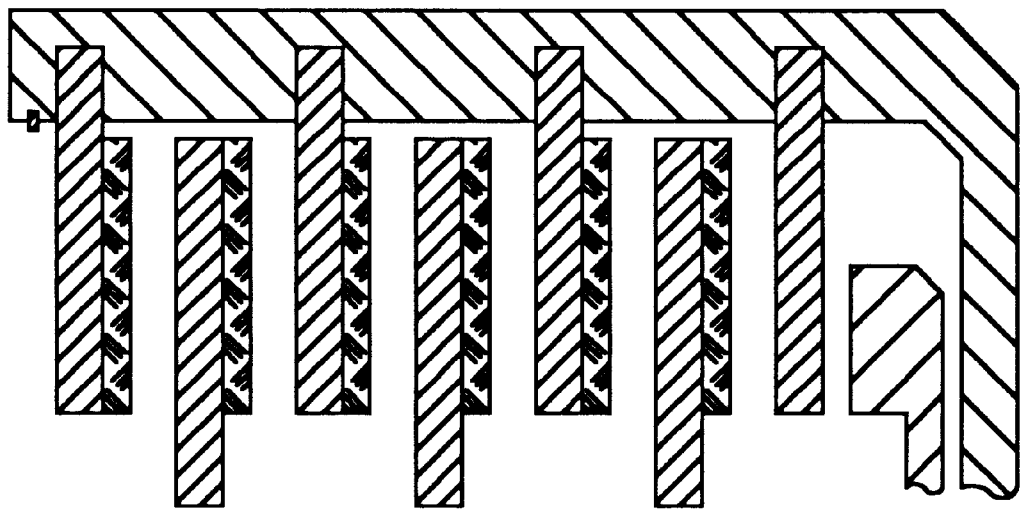
FIG. 3 is a schematic longitudinal section of a friction clutch mechanism of the unilateral clutch disc type, in which the clutch discs are engaged at their inner peripheries.

The notches provided on the inner circumferences of the externally toothed clutch plates in accordance with the invention can take various forms. FIG. 5(*a*) shows a typical externally toothed clutch plate 10A in accordance with the invention, having rectangular notches 111 in its inner circumference. FIG. 5(*b*) shows a clutch plate 10B, having V-shaped notches 121 with round bottoms. FIG. 5(*c*) shows a clutch plate 10C, having U-shaped notches 131. FIG. 5(*d*) shows a clutch plate 10D, having V-shaped notches 141. Preferably, in each case the notches are arranged at equal angular intervals. The embodiments of FIGS. 5(*a*), 5(*b*), 5(*c*) and 5(*d*) are effective when the clutch discs are engaged at their inner peripheries as shown in FIG. 3. With the respective inner peripheral portions of the internally toothed clutch discs and the externally toothed clutch discs in engagement with each other, the circumferential or radial strain in the externally toothed clutch discs is absorbed by the notches formed in the inner circumference of the externally toothed clutch discs, so that the externally toothed clutch discs are not distorted. The inner peripheral portions of the internally toothed clutch discs are resistant to thermal strain by virtue of the teeth on their inner peripheral portions.

Figure 4:
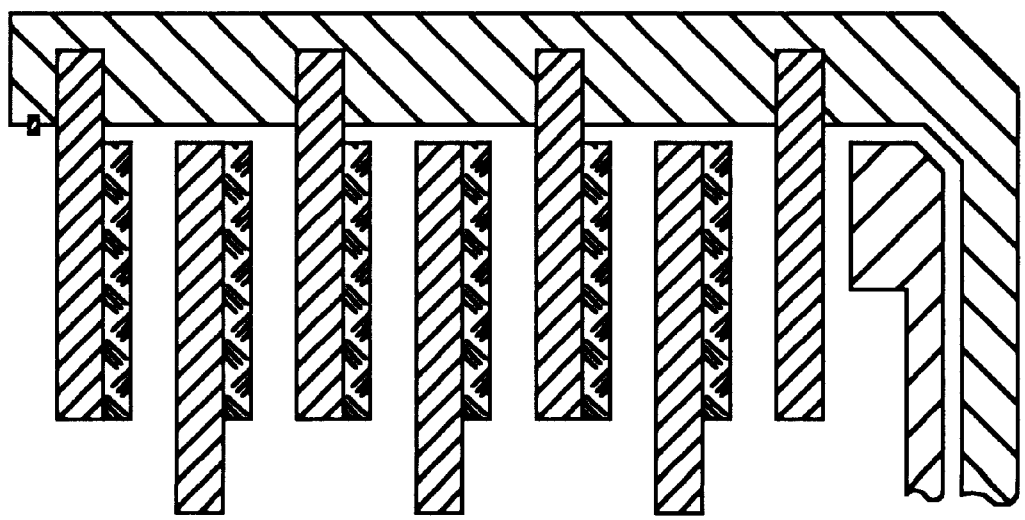
FIG. 4 is a schematic longitudinal section of a friction clutch mechanism of the unilateral clutch disc type, in which the clutch discs are engaged at their outer peripheries.
Figure 5A:
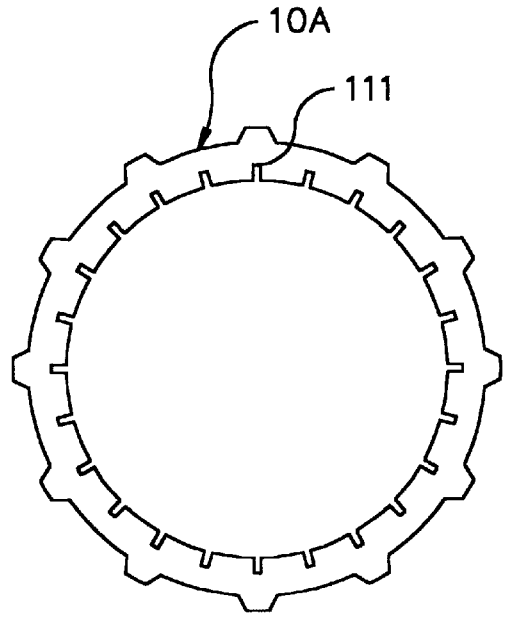
FIGS. 5(a), 5(b), 5(c) and 5(d) are elevational views of externally toothed clutch disc plates, with notches of various different types in their inner circumferences.
Figure 5B:
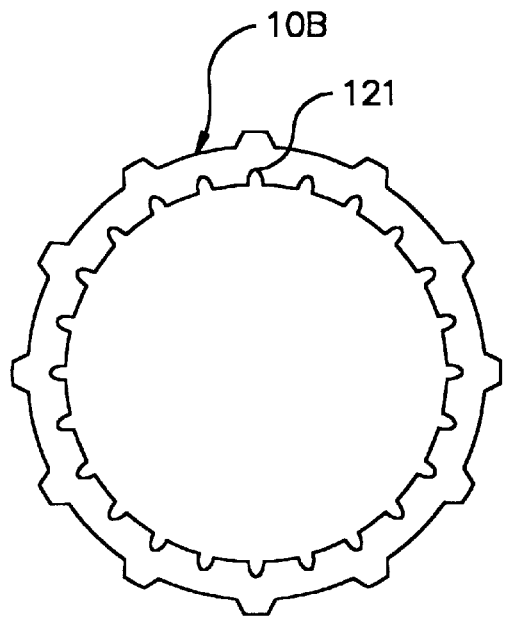
Figure 5C:
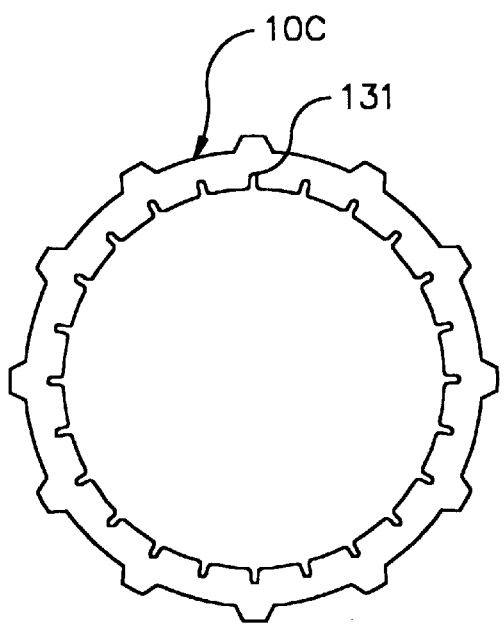
Figure 5D:
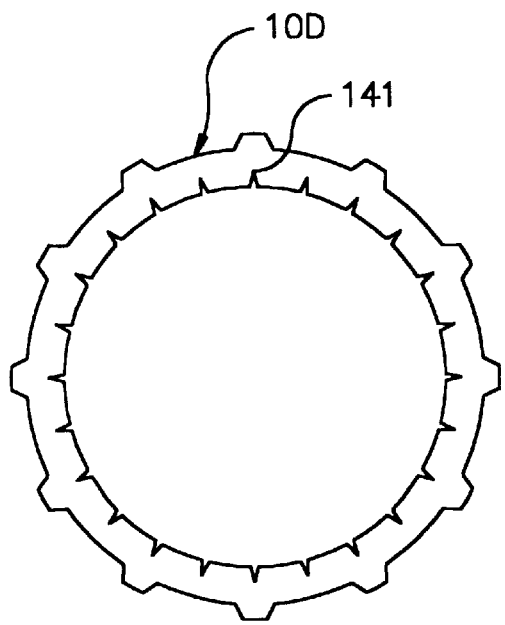
Figure 6A:
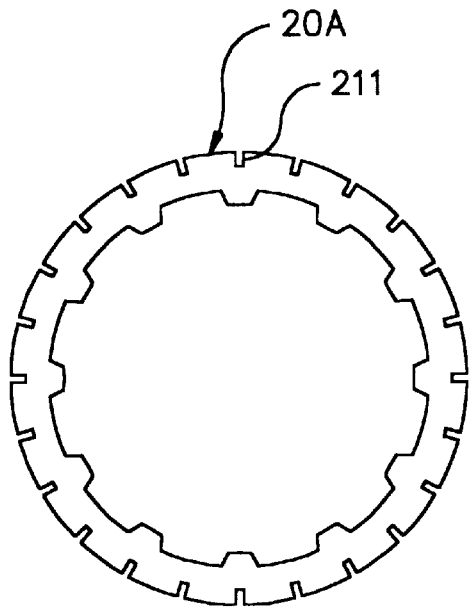
FIGS. 6(a), 6(b), 6(c) and 6(d) are elevational views of internally toothed clutch disc plates, with notches of various different types in their outer circumferences.
Figure 6B:
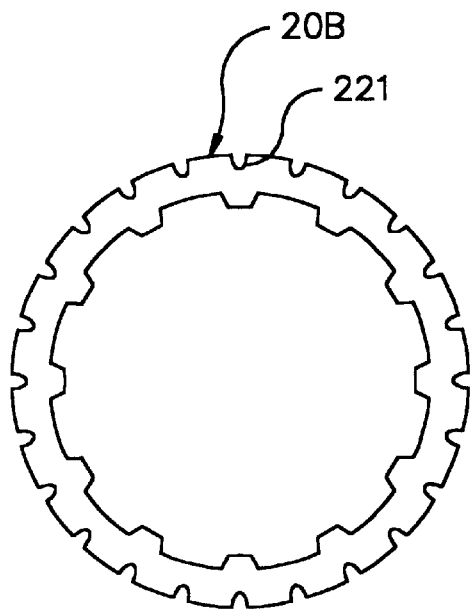
Figure 6C:
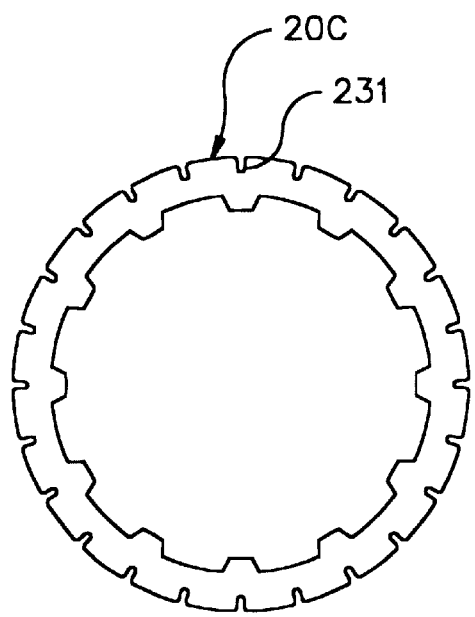
Figure 6D:
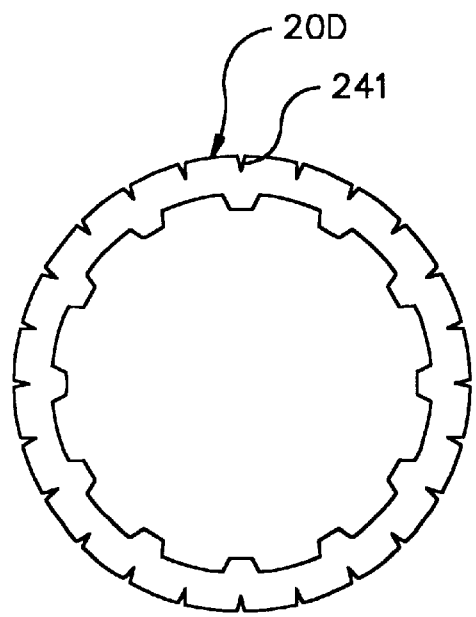

The notches provided on the outer circumferences of the internally toothed clutch plates in accordance with the invention can also take various forms, as shown in FIGS. 6(*a*), 6(*b*), 6(*c*) and 6(*d*). FIG. 6(*a*) shows a typical internally toothed clutch plate 20A in accordance with the invention, having rectangular notches 211 in its outer circumference. FIG. 6(*b*) shows a clutch plate 20B, having V-shaped notches 221 with round bottoms. FIG. 6(*c*) shows a clutch plate 20C, having U-shaped notches 231. FIG. 6(*d*) shows a clutch plate 20D, having V-shaped notches 241. Again, as in the case of the notches of the externally toothed discs, the notches are preferably arranged at equal angular intervals. The embodiments of FIGS. 6(*a*), 6(*b*), 6(*c*) and 6(*d*) are effective when the clutch discs are engaged at their outer peripheries as shown in FIG. 4. With the respective outer peripheral portions of the externally toothed clutch discs and the internally toothed clutch discs in engagement with each other, the circumferential or radial strain in the internally toothed clutch discs is absorbed by the notches formed in their outer circumferences, so that the internally toothed clutch discs are not distorted. The outer peripheral portions of the externally toothed clutch discs are resistant to thermal strain by virtue of their teeth.

The graph of FIG. 7 illustrates the dependence of the distortion of a clutch plate on the temperature difference between its inner and outer peripheral portions. The graph depicts the effects of temperature difference between the inner and outer portions of a clutch plate without notches, and a notched clutch plate. The abscissae are temperature difference indices representing the temperature difference between the inner and outer peripheral portions of the clutch plates, and the ordinates are distortion indices representing distortion. The graph shows that the distortion of the plate without notches increases sharply when the temperature difference exceeds a certain level corresponding to a temperature difference index of 50. However the distortion of the notched plate scarcely changes regardless of the temperature difference between its inner and outer peripheral portions. Thus the notches are effective in preventing distortion of the plate.

As is apparent from the foregoing description, in the unilateral clutch disc type friction clutch mechanism in accordance with the invention, the notches formed in the plates of the clutch discs absorb thermal strain and prevent distortion, when the clutch discs are unevenly engaged, either by engagement at their inner peripheries as depicted in FIG. 3, or at their outer peripheries as depicted in FIG. 4. Accordingly, the clutch mechanism of the invention is capable of operating effectively and reliably over an extended time The friction clutch of this invention, while specifically described in the context of an automatic transmission, can be used in other applications where thermal distortion due to uneven loading is a problem. Various modifications can be made to the clutch structure specifically described. For example the numbers and shapes of the clutch discs can be varied, as can the numbers and shapes of the notches therein. Still other modifications may be made to the apparatus and method described above without departing from the scope of the invention as defined in the following claims.

We claim:

1. A unilateral friction clutch mechanism comprising a torque transmitting unit having:

axially alternately arranged internally toothed clutch discs, and externally toothed clutch discs, each provided with a friction member on one surface thereof; and piston means for effecting engagement of the internally toothed clutch discs and the externally toothed clutch discs to transmit torque;

wherein each of the internally and externally toothed clutch discs comprises a plate having notches, the notches of each of the plates of the internally toothed clutch discs being limited to notches in its outer circumference, and the notches of each of the plates of the externally toothed clutch discs being limited to notches in its inner circumference.

2. A unilateral friction clutch mechanism comprising a torque transmitting unit having:

- a first set of internally toothed clutch discs, the clutch discs of the first set comprising a plurality of plates, each having opposite faces, arranged in spaced relationship to one another along an axis perpendicular to the faces of the plates, each of the plates of the clutch discs of the first set having an outer periphery, and at least all but one of the plates of the first set having a friction member, each plate of the first set with a friction member having its friction member only on one face thereof;

- a second set of externally toothed clutch discs, the clutch discs of the second set also comprising a plurality of plates, each having opposite faces, arranged in spaced relationship to one another along the axis with their faces in perpendicular relationship to the axis, the plates of the clutch discs of the second set having an inner periphery, and at least all but one of the plates of the second set having a friction member, each plate of the second set with a friction member having its friction member only on one face thereof;

- the clutch discs of the first and second set being in interleaved relationship, and the friction members all facing in the same direction along the axis whereby each of the friction members is engageable with an opposed disc plate; and

- piston means for effecting engagement of the friction members with opposed disc plates;

- wherein each of the plates of the internally and externally toothed clutch discs has notches, the notches of each of the plates of the internally toothed clutched discs being limited to notches in its outer circumference, and the notches of each of the plates of the externally toothed clutch discs being limited to notches in its inner circumference.

* * * * *